J. H. MINER.
GAS SAVER ATTACHMENT FOR MOTOR VEHICLES.
APPLICATION FILED JAN. 23, 1917.
1,224,774.
Patented May 1, 1917.
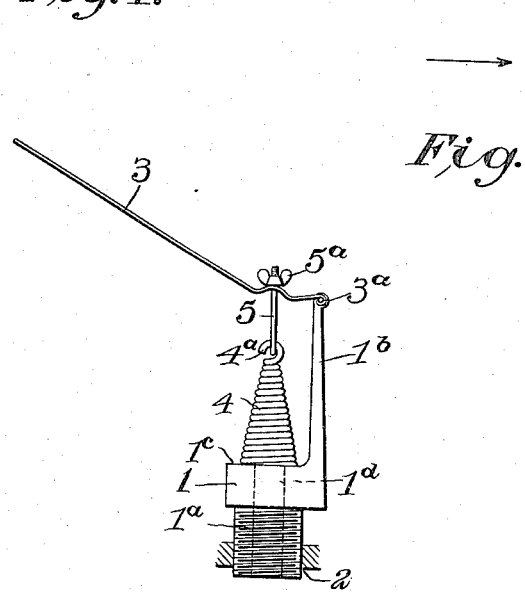
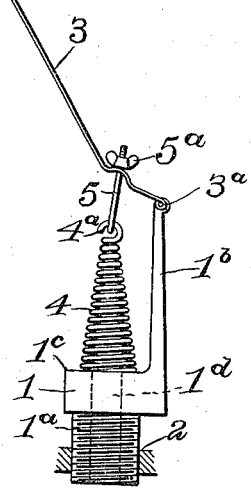
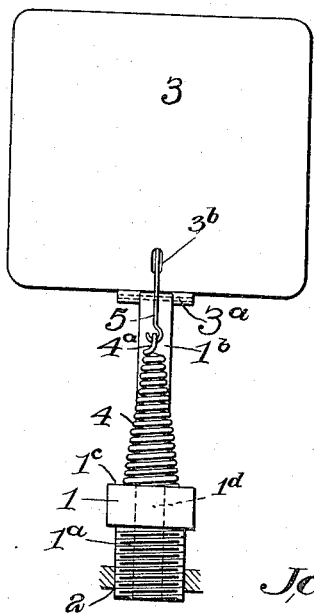
Inventor:
James H. Miner,
Spear Middleton Donaldson Spear
Atty's.

UNITED STATES PATENT OFFICE.

JAMES H. MINER, OF LUMBERTON, MISSISSIPPI.

GAS-SAVER ATTACHMENT FOR MOTOR-VEHICLES.

1,224,774.

Specification of Letters Patent.

Patented May 1, 1917.

Application filed January 23, 1917. Serial No. 144,018.

*To all whom it may concern:*

Be it known that I, JAMES H. MINER, a citizen of the United States, and resident of Lumberton, Mississippi, have invented certain new and useful Improvements in Gas-Saver Attachments for Motor-Vehicles, of which the following is a specification.

My present invention relates to improvements in attachments for motor vehicle engines of the internal combustion type adapted for saving gasolene by admitting additional air to the air intake manifold as the speed of the engine increases, thereby securing more perfect combustion.

The invention includes the novel features of construction and arrangement and combination of parts hereinafter described and particularly defined by the appended claim.

An embodiment of my invention is illustrated in the accompanying drawings, in which, Figure 1 is a plan view of my improved device showing parts in the position assumed when the motor vehicle is traveling slowly.

Fig. 2 is a similar view showing the position assumed by the parts when the vehicle is speeded up.

Fig. 3 is a front view.

Referring by reference characters to this drawing the numeral 1 designates a tubular plug having a threaded portion $1^a$ designed to be screwed into a threaded opening in the intake of the engine manifold, which intake is indicated at 2. This plug has an outwardly projecting arm $1^b$, to the extremity of which is hinged a fan blade or wing 3 by a suitable hinge, as indicated at $3^a$. The outer face of the plug is formed flat, as indicated at $1^c$ and upon this flat face and in line with the bore $1^d$ of the plug is located a coiled spring 4. This spring is of the close coiled type, to wit, of the character which when contracted has its coils in contact with each other and it is closed or practically closed at its outer end.

My preferred manner of constructing the spring is to have it of conical form, so that the outer end is practically closed by the last or outermost coil.

This spring 4 has its lowermost coil secured to the face $1^c$ of the plug, preferably by soldering or brazing it thereto, while at its outer end said spring is connected to the wing 3. A convenient means of effecting this connection is to provide the outer coil of the spring 4 with an integral eye $4^a$, which is engaged by the eye of an eye-bolt 5, which passes through a slotted portion $3^b$ in the wing 3 and is provided with a wing-nut $5^a$ by the adjustment of which the inclination of the wing 3 may be varied.

It will be understood that my attachment will be applied to the engine intake in such a manner that the wing 3 will incline forwardly and hence when the machine is traveling forwardly the air will travel in a reverse direction with relation to such wing, as indicated by the arrow, and, impinging against the wing tend to swing the same backwardly.

If the motor vehicle is traveling slowly the action of the wind or air will not be sufficiently strong to overcome the tension of the spring, which will remain in the close-coiled condition shown in Fig. 1, whereby no air will be permitted to pass through the coils, but as the speed of the vehicle increases and the air resistance becomes greater the wing will tend to be swung back toward or into the position shown in Fig. 2, which will have the effect of extending the spring 4 and hence opening the coils thereof to permit air to pass through said coils and through the bore $1^d$ of the plug 1 into the engine intake pipe.

The greater the speed of the car the more the coil of the spring 4 will be opened, and hence the greater the amount of additional air.

My attachment is very simple, is capable of being readily applied to any automobile engine of the internal combustion type, and has no parts which are liable to stick or become deranged.

Having thus fully described my invention what I claim as new and desire to secure by Letters Patent is:

An attachment for internal combustion engines comprising a screw plug adapted to be screwed into an opening in the air intake manifold of said engine, said plug having an air passage therethrough and a flat seat surrounding the outer end of said passage, a spiral close-coil spring having its base secured to said flat seat, said plug having an arm at one side extending outwardly beyond the extremity of the close coil spring, a fan blade or wing pivoted to the extremity of said arm, and means for adjustably connecting said fan blade with said spring, substantially as described.

JAMES H. MINER.

Witnesses:
R. W. HINTON,
C. T. CAROTHERS.

Copies of this patent may be obtained for five cents each, by addressing the "Commissioner of Patents, Washington, D. C."